United States Patent [19]
Mansfield

[11] Patent Number: 5,590,716
[45] Date of Patent: Jan. 7, 1997

[54] METHOD OF INHIBITING DOWNHOLE CORROSION OF METAL SURFACES

[75] Inventor: William D. Mansfield, Baker, La.

[73] Assignee: Drew Chemical Corporation, Boonton, N.J.

[21] Appl. No.: 431,274

[22] Filed: Apr. 28, 1995

Related U.S. Application Data

[63] Continuation of Ser. No. 322,935, Oct. 13, 1994, abandoned.
[51] Int. Cl.$^6$ .............................. E21B 41/02; C23F 11/08
[52] U.S. Cl. .......................... 166/302; 166/267; 166/310; 166/902; 507/239; 507/939
[58] Field of Search ..................................... 166/310, 279, 166/902, 265–267; 507/939, 239, 245; 208/47; 422/7

[56] References Cited

U.S. PATENT DOCUMENTS

| | | |
|---|---|---|
| 2,336,598 | 12/1943 | Downing et al. . |
| 2,446,969 | 8/1948 | Welch et al. . |
| 2,483,778 | 10/1949 | Morrell et al. . |
| 2,884,067 | 4/1959 | Marken .............................. 166/310 X |
| 2,947,795 | 8/1960 | Keown . |
| 3,298,435 | 1/1967 | Schoenfeld et al. ................ 166/310 X |
| 3,683,024 | 8/1972 | Kuntschik et al. . |
| 4,132,268 | 1/1979 | Harrison .............................. 166/902 X |
| 4,237,326 | 12/1980 | Fuga et al. . |
| 4,269,717 | 5/1981 | Slovinsky . |
| 4,487,745 | 12/1984 | Weiss et al. . |
| 4,497,702 | 2/1985 | Miller et al. . |
| 4,556,476 | 12/1985 | Miller et al. . |
| 4,927,519 | 5/1990 | Forester . |
| 5,100,532 | 3/1992 | Roling et al. . |
| 5,213,678 | 5/1993 | Rondum et al. . |
| 5,243,063 | 9/1993 | Devicaris et al. . |
| 5,282,957 | 2/1994 | Wright et al. . |

FOREIGN PATENT DOCUMENTS 6413041 1/1989 Japan .
1566106 4/1980 United Kingdom .

OTHER PUBLICATIONS

Abstract of Japanese Patent 64–13041, Publication No. JP1013041, Feb. 1989, 1 pg.
Ashland Chemical, Inc., Mekor® CG Corrosion Inhibitor, 1993, 2 pgs.
Ashland Oil, Inc., Corrosion Control and Pipeline Protection, 1993, 2 pgs.
Ashland Chemical, Inc., Mekor® Corrosion Inhibitor, 1993, 2 pgs.
Drew Chemical Corp., Mekor® 70 Corrosion Inhibitor, 1990, 1 pg.
Ashland Chemical, Inc., Mekor® 70 Corrosion Inhibitor, 1993, 1 pg.

*Primary Examiner*—Stephen J. Novosad
*Attorney, Agent, or Firm*—Wood, Herron & Evans, P.L.L.

[57] ABSTRACT

A method of inhibiting corrosion on metal surfaces and downhole equipment and above surface separation equipment from a mixture of brine and crude oil extracted from underground formations. The method comprises the injection on a periodic basis of an effective amount of an oxime compound having the formula:

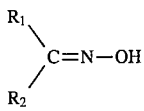

in which $R_1$ and $R_2$ are the same or different and are selected from hydrogen, lower alkyl groups of one to eight carbons or aryl groups. In addition to functioning as a corrosion inhibitor for the metal surfaces in contact with the mixture, the oxime compound is less susceptible to neutralization by contact with acidic species, and is less likely to emulsify the brine and crude oil mixture brought to the surface.

12 Claims, 1 Drawing Sheet

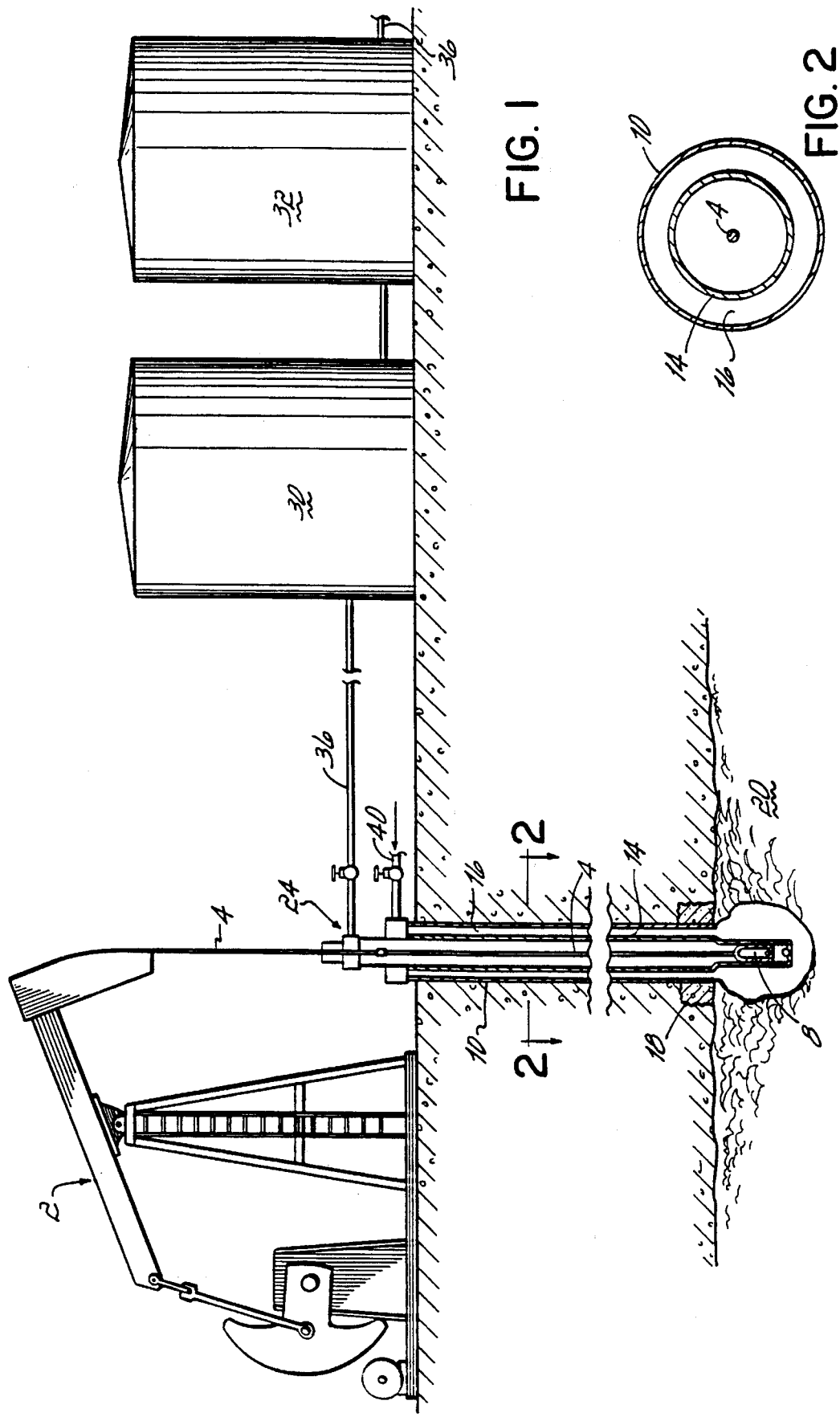

5,590,716

METHOD OF INHIBITING DOWNHOLE CORROSION OF METAL SURFACES

This is a continuation of application Ser. No. 08/322,935, filed Oct. 13, 1994, now abandoned.

FIELD OF THE INVENTION

The invention relates to an improved method of inhibiting corrosion on the metal surfaces of equipment used in the extraction of mixtures of brine and crude oil from below ground and in the initial separation of brine from the crude oil.

BACKGROUND OF THE INVENTION

Virtually all crude oil deposits located in formations below ground lay above a layer of concentrated salt water, or brine, which is thought to be the remnants of ancient lakes and oceans which have partially evaporated with consequent concentration of the dissolved minerals. When a well is drilled into a formation to extract the crude oil, a portion of the brine is also carried along in the production stream. For newly drilled wells, the amount of brine carried along in the production stream may be as little as 5% percent of the total weight of liquid. After many years of operation, however, a well may produce as much as 90% brine and only 10% crude oil. As used herein, crude oil includes all hydrocarbon fractions extracted from underground formations, as understood by those skilled in the art.

The average depth of a well is between approximately 1,500 to 3,000 meters. The well consists of an outer casing surrounding production tubing, at the bottom of which is a cylindrical pump unit. Oil enters the casing at the bottom thereof through perforations in the casing wall. Between the outer casing and production tubing is a concentric volume known as the annulus. In certain instances, the pressure in the formation is sufficient to propel the brine and crude oil mixture through the production tubing to the surface without any separate pumping effort. As the well ages, however, pumping becomes necessary to bring the mixture to the surface. One common device used for pumping the brine and crude oil mixture to the surface is a walking beam pump. This pump is comprised of a beam supported by a center pivot, with a counterweight on one end of the beam and a rod extending to the bottom of the well at the other. Rotary motion applied to a cam connected to the counterweight end of the beam results in a repetitive vertical motion at the rod end of the beam. The rod, called a sucker rod, attaches to the cylindrical pump at the bottom of the well. This rod is made of a solid steel alloy, typically about 1.6 cm in diameter and is constructed by joining together individual rod lengths of about 9.1 meters each using screw connections. Every downstroke of the beam fills the pump, and every upstroke pulls the pump contents up the production tubing. Once the brine and crude oil mixture reaches the surface, it is transported through various tubing members to equipment which is used to separate the brine from the crude oil. This equipment includes free water knock-out tanks, separators and holding tanks, as well as heater treaters which assist in breaking any emulsions of brine and crude oil through either heat or demulsifying chemicals after the mixture is brought to the surface. When the well is extracting a substantial natural gas portion, the material passing up the production tubing is first conducted to a separator and then to a dehydrator unit. The dried natural gas thereafter is conducted to a pipeline for transport and sale.

The metal components comprising the extraction and separation equipment are made from carbon steel, which is susceptible to corrosion, particularly in the presence of brine. The salt concentration of the brine can be as low as about 0.5% by weight. In the West Texas oil fields, the concentration of salt in the brine can range from about 1% to about 12% by weight, though it may reach as high as 18 to 20%. In contrast, the salt content of brine in California oil fields can be as low as about 1.5% by weight, but is more typically in the 6% range.

Corrosion of the extraction and separation equipment is most evident on those components which are subjected to high liquid flow velocities, such as the cylindrical pump at the bottom of the well. The potential economic damage to the oil field well due to corrosion is evident from observation of the sucker rod. Contact with the brine and crude oil mixture, which further may contain dissolved acidic gases such as hydrogen sulfide and carbon dioxide, causes pitting type corrosion along the length of the sucker rod. If the corrosion sufficiently weakens the sucker rod to cause breakage, the well must be shut down and the downhole components completely disassembled. The breakdown and repair time may result in two days of downtime at that particular pump. Since in normal operation with existing corrosion inhibitor additives, the sucker rod may break as often as every two to six months of operation, it is a primary goal to extend the working life of this component.

In previous efforts to inhibit corrosion in the equipment used for extracting the brine and crude oil mixture from underground formations, and in subsequently removing the brine from the crude oil, it was known to use various amine compounds in the equipment. More specifically, certain amine compounds generally known as filming amines have been utilized in this application to inhibit corrosion. Certain filming amine compounds known to have utility in this application are derivatives of imidazoline. The filming amine compounds, which are alkaline, are reactive with acidic species. In the underground formations, gases such as hydrogen sulfide and carbon dioxide, among others, are found which solubilize in the water component of the brine to form acidic species. These acids will react with the amines and thereby adversely affect their activity as a corrosion inhibitor. Further, the active amines as well as the amine salts formed from the reaction with the acidic species tend to facilitate formation of an emulsion of the crude oil and brine. The emulsions contain valuable crude oil which must be further treated using demulsifying chemicals or other separation means, such as heat, to break the emulsion and recover the crude oil.

SUMMARY OF THE INVENTION

It has been found that the corrosion formed on the metal components of both the downhole equipment used for extracting the brine and crude oil mixture and the above ground equipment for separating the brine from the crude oil can be substantially inhibited by the periodic addition of certain oxime compounds into the well. Specifically, the oxime compounds are periodically injected into the ground in proximity to the metal equipment used for extracting the brine and crude oil mixture. Typically, the oxime compound is introduced into the concentric volume between the outer casing and the production tubing of the well, though it could also be introduced via a separate injection well terminating near the bottom of the extraction well. The oxime compound is flushed into the lower reaches of the well by the subsequent addition of fresh water, brine, or the brine and crude oil mixture. The perforations at the bottom of the casing allow a brine and crude oil mixture to seep into the annulus between the casing and production tubing, sometimes extending several hundred feet upward from the bottom of the well. The oxime compound, upon reaching this pool of brine and crude oil from the surface, must then disperse in the mixture and migrate to the bottom of the well so that it comes in contact with the metal parts of the pump. Once the oxime compound reaches the bottom of the well, it is carried upward along the inside of the production tubing by the action of the pump. In traveling up the production tubing, the oxime compound contacts the inside metal surface of the production tubing as well as the sucker rod, and any additional tubing or other metal components which are in contact with the upward flowing brine and crude oil mixture.

The oxime compound dispersed in the brine and crude oil mixture also contacts the internal metal surfaces of the tubing and separation equipment above ground used for separating the brine from the crude oil. So long as the above ground metal equipment does not introduce any inactivating material to the brine and crude oil mixture or the separate brine and crude oil components, such as oxygen, the oxime compound continues to protect from further corrosion the metal surfaces with which it makes contact.

It is therefore an object of the invention to provide a method of inhibiting corrosion on the metal surfaces of equipment used to extract brine and crude oil mixtures from underground formations.

It is a further object of the invention to provide a method of inhibiting corrosion on the metal surfaces of separating equipment above ground used to separate brine from crude oil.

It is yet a further object of the invention to provide a method of inhibiting corrosion on the metal surfaces of extraction and separation equipment by the injection of an oxime compound into the extraction equipment from the surface.

These and other objects and advantages of the invention are disclosed in more detail below and in the drawings, in which:

BRIEF DESCRIPTION OF THE DRAWINGS

FIG. 1 is a schematic view of an oil field pump, well, separation and storage equipment.

FIG. 2 is a cross-sectional view of the downhole components of the well taken along line 2—2 in FIG. 1.

DETAILED DESCRIPTION OF THE INVENTION

In its broader aspects, the invention relates to a method of inhibiting corrosion on metal surfaces of equipment used in extracting brine and crude oil mixtures from below ground and separating the crude oil from the brine, comprising injecting into the ground on a periodic basis in proximity to the equipment used in extracting the brine and crude oil mixtures an effective amount of an oxime compound having the formula:

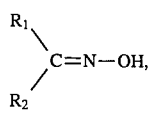

in which $R_1$ and $R_2$ are the same or different and are selected from hydrogen, lower alkyl groups of one to eight carbons or aryl groups.

In the case of a downhole well consisting of an outer casing with inner concentric production tubing serving as the conduit for the extracted mixture, the oxime compound is preferably injected into the ground by introducing the compound into the concentric volume between the outer casing and the production tubing of the well.

Typically, the oxime compound is heated to a temperature of at least 60° C. prior to use as a corrosion inhibitor. This can be done prior to injection of the oxime compound into the ground. Alternatively, if the depth of the well is sufficient, the temperature underground can rise to a level of at least about 50° C. In that instance, the oxime compound may be introduced into the well without prior heating. Downhole temperatures are typically in the range of about 50°–80° C. and can be as high as about 150° C.

Referring to the drawings, the walking beam pump 2 is connected to the sucker rod 4 which extends down into the well and connects to the pump unit 8. The well is protected from collapsing by the outer casing 10 which surrounds the production tubing 14. The annulus 16 is that volume between the outer casing 10 and production tubing 14, as further shown in FIG. 2. The outer casing 10 is anchored in position by the formation of a concrete seal 18 around the lower terminus of the outer casing 10, formed by injection of concrete down the well from the surface.

The brine and crude oil mixture from the formation 20 is drawn up the production tubing 14 to the wellhead 24, and thereafter to the separation and storage units 30 and 32 via surface piping 36. As discussed previously, the separation units may include free water knock-out tanks, heater treaters, separators and dehydrators, and other units well known to those skilled in the art. Thus, though only one separation unit 30 is shown in the drawings, and one storage unit 32, which can include both make and stock tanks, additional units can be connected into the system as the circumstances warrant.

Injection of the oxime and additional flushing liquid into the well is effected through inlet pipe 40. It has been found that a concentration of oxime compound in a range of about 1 to about 10 ppm, and more preferably about 1 to about 5 ppm, measured as the concentration by weight of the oxime in the brine and crude oil mixture sampled at the wellhead 24, has been found sufficient to provide a corrosion inhibition effect.

The method of the invention has been found particularly useful in wells having relatively high salt concentrations, such as wherein the brine has a salt content of at least 10% by weight. However, the method is expected to provide acceptable levels of corrosion inhibition wherein the brine has a lower salt content of as low as about 0.5% by weight, as well as where the brine has a salt content of at least 15% by weight and even at least 20% by weight. Since a large number of domestic wells have been pumping for a number of years, the brine content of the brine and crude oil mixture is typically greater than 50% by weight. The method of the invention has been found to provide effective corrosion inhibition where the brine component of the brine and crude oil mixture is at least 50% by weight. It is expected that satisfactory corrosion inhibition results will be provided where the brine component is less than 50% by weight of the brine and crude oil mixture. Further, it is expected that the method will provide satisfactory corrosion inhibition results wherein the brine component is at least 70% by weight, and even where it is at least 90% by weight of the brine and crude oil mixture.

The oxime compound is not reactive with acidic species such as those formed in the brine water from gases trapped in the underground formations. Therefore, the oxime compound is not adversely affected by contact with the acidic species. Also, the oxime compound is much less likely to act as an emulsifier for the brine and crude oil mixture than presently available filming amines used in downhole applications. Thus, the brine is more easily separated from the oil after being pumped to the surface relative to the use of a filming amine as a corrosion inhibitor.

The method was tested on a well about 1675 meters deep in a West Texas oil field having between 10% and 12% salt in the brine, which constituted about 60% by weight of the brine and crude oil mixture. This well had been previously treated with a filming amine, believed to be a tertiary amine such as an imidazoline derivative. That amine had been added at the rate of one time per month down the annulus 16 from inlet pipe 40 and flushed down the well with brine to provide an industry-accepted amine concentration in the mixture. The observed corrosion rates using an electrical resistance corrosion monitor, such as the CORRATOR unit manufactured by Magna which monitored the brine stream above ground, were approximately 20 mils (thousandths of an inch) per year (MPY) measured in the surface piping 36. These results were compared to the corrosion rate in that same well after treatment with methylethyl ketoxime as MEKOR 70 from the Drew Industrial Division of Ashland Chemical injected into the annulus 16 of the well initially once a month at a concentration sufficient to provide an oxime concentration of 5 ppm by weight in the brine and crude oil mixture. MEKOR 70 is a solution of 70% by weight methylethyl ketoxime in water. This concentration was achieved by initially injecting about 75 liters of MEKOR 70 into the annulus 16 between the outer casing 10 and the production tubing 14. This injection was followed by the addition of about 1600 liters of brine to flush the oxime to the bottom of the well. The CORRATOR unit monitoring the brine stream not only in the surface piping 36, but also at the free water knock-out tank, heater treater and the holding tank for the separated crude oil provided corrosion measurements of less than approximately 1.0 MPY, on the order of 0.1–0.2 MPY at each location. The amine corrosion rate information was based on filming amine treatment at the well which had continued with little fluctuation over a period of several years. The corrosion rate information based on incorporation of methylethyl ketoxime was generated over a period of three months. The methylethyl ketoxime was heated prior to injection to a temperature of about 60° C. As an alternative to infrequent additions of oxime into the well, it has been found that satisfactory results are obtained by the use of metering pumps to inject the oxime into the well on a more regular basis.

The methylethyl ketoxime has been found to have approximately equal solubility in crude oil and brine, so that the oxime is present in both components of the mixture from the pump unit 8 to the surface, and thereby into the separation equipment 30. This ability of the methylethyl ketoxime to disperse into both phases facilitates its transport to the pump unit 8 from the pool of brine and crude oil in the volume between the outer casing 10 and the production tubing 14 upon initial injection of the oxime into the well. There is some agitation in the pool of brine and crude oil in the annulus 16 volume between the outer casing 10 and the production tubing 14 attributable to the flow induced by the pump unit 8 at the bottom of the well. Nevertheless, the agitation is relatively slight, and effective transport of the corrosion inhibitor is facilitated by the solubility of the oxime in both organic and aqueous phases.

Thus is it apparent that there has been provided, in accordance with the invention, a method of inhibiting corrosion on metal surfaces of equipment used in extracting brine and crude oil mixtures from below ground and separating the crude oil from the brine, which fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, departures may be made from such details without departing from the spirit or scope of the general inventive concept.

What is claimed is:

1. A method of inhibiting corrosion on metal surfaces of equipment used in extracting brine and crude oil mixtures from below ground and separating the crude oil from the brine, comprising:

injecting into the ground on a periodic basis in proximity to the equipment used in extracting brine and crude oil mixtures an effective corrosion inhibiting amount of an oxime compound having the formula:

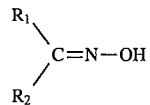

in which $R_1$ and $R_2$ are the same or different and are selected from hydrogen, lower alkyl groups of one to eight carbons or aryl groups.

2. The method of claim 1 further wherein said oxime compound is heated to a temperature of at least 60° C. prior to said injection.

3. The method of claim 1 further wherein said effective corrosion inhibiting amount of said oxime compound is in the range of about 1 to about 10 ppm by weight measured as the concentration of said oxime in the brine and crude oil mixture from below ground sampled as said mixture is collected above ground.

4. The method of claim 3 wherein said effective corrosion inhibiting amount of said oxime compound is in the range of about 1 to about 5 ppm.

5. The method of claim 1 wherein said oxime is injected into an annulus between an outer casing and production tubing of a well, followed by flushing with a liquid selected from the group consisting of water, brine, and a mixture of brine and crude oil.

6. The method of claim 1 wherein said equipment used in extracting brine and crude oil mixtures has metal surfaces which contact brine having a salt content of at least 0.5% by weight.

7. The method of claim 6 wherein said brine has a salt content of at least 10% by weight.

8. The method of claim 6 wherein said brine has a salt content of at least 15% by weight.

9. The method of claim 6 wherein said brine has a salt content of at least 20% by weight.

10. The method of claim 1 wherein said equipment for extracting brine and crude oil mixtures has metal surfaces wherein the concentration of brine in said brine and crude oil mixture is at least 50% by weight.

11. The method of claim 10 wherein the concentration of brine in said brine and crude oil mixture is at least 70% by weight.

12. The method of claim 10 wherein the concentration of brine in said brine and crude oil mixture is at least 90% by weight.

* * * * *